(12) United States Patent
Sebal (10) Patent No.: US 9,914,188 B2
(45) Date of Patent: Mar. 13, 2018

(54) METHOD AND MACHINE FOR MACHINING PARTS IN BAR FORM WITH AUTOMATIC PART REVERSING AND RECALIBRATION SYSTEM

(71) Applicant: CINETIC MACHINING, Saint-Laurent-les-Tours (FR)

(72) Inventor: Jean-Luc Sebal, Monvalent (FR)

(73) Assignee: FIVES MACHINING (FR)

( * ) Notice: Subject to any disclaimer, the term of this patent is extended or adjusted under 35 U.S.C. 154(b) by 828 days.

(21) Appl. No.: 14/269,975

(22) Filed: May 5, 2014

(65) Prior Publication Data
US 2014/0328642 A1 Nov. 6, 2014

(30) Foreign Application Priority Data
May 6, 2013 (FR) ...................... 13 54126

(51) Int. Cl.
*B23Q 1/52* (2006.01)
*B23C 3/00* (2006.01)
(Continued)

(52) U.S. Cl.
CPC .............. *B23Q 1/527* (2013.01); *B23C 3/002* (2013.01); *B23Q 1/76* (2013.01); *B23Q 3/064* (2013.01);
(Continued)

(58) Field of Classification Search
CPC ............. Y10T 29/5109; Y10T 29/5144; Y10T 82/2593; Y10T 82/2597;
(Continued)

(56) References Cited

U.S. PATENT DOCUMENTS 4,404,727 A * 9/1983 Zankl ................. B23Q 3/15513
483/14
6,634,072 B2 * 10/2003 Ohmori .................... B23Q 7/02
269/20
(Continued)

FOREIGN PATENT DOCUMENTS

EP 0705655 A1 * 4/1996 ......... B23K 26/0823
EP 2172301 4/2010
(Continued)

*Primary Examiner* — Erica E Cadugan
*Assistant Examiner* — Michael Vitale
(74) *Attorney, Agent, or Firm* — The Belles Group, P.C.

(57) ABSTRACT

An automatic method for changing the machining reference frame on a machine for machining parts from bars, notably extruded or molded profile sections, the part to be machined being held during its machining by at least two distinct and independent clamping means each having a longitudinal movement and a rotation on an axis parallel to the long axis of the part to be machined allowing for a relative angular and longitudinal displacement of one relative to the other, a method whereby, in order to proceed with a change of reference frame, one of the clamping means releases the part to be machined and disengages therefrom to turn freely about the long axis of the part independently of the other clamping means, then aligns itself angularly on new clamping references of the part before retaking the latter and allowing for a change of grip by the other clamping means.

8 Claims, 8 Drawing Sheets (51) Int. Cl.
    *B23Q 1/76*    (2006.01)
    *B23Q 3/06*    (2006.01)
    *B23Q 7/00*    (2006.01)
    *B23Q 7/04*    (2006.01)
    *B23Q 7/16*    (2006.01)

(52) U.S. Cl.
    CPC ............ *B23Q 7/00* (2013.01); *B23C 2270/08* (2013.01); *B23Q 7/048* (2013.01); *B23Q 7/165* (2013.01); *Y10T 29/5114* (2015.01); *Y10T 82/10* (2015.01); *Y10T 82/2593* (2015.01); *Y10T 409/30896* (2015.01); *Y10T 409/303752* (2015.01); *Y10T 409/305656* (2015.01); *Y10T 409/308792* (2015.01)

(58) Field of Classification Search
    CPC . Y10T 409/305656; Y10T 409/305768; Y10T 29/5114; B23Q 1/527; B23Q 1/76; B23Q 3/064; B23C 3/002
    USPC .......... 29/27 C, 27 R; 82/162, 164; 269/258, 269/289 MR, 296; 409/165, 167
    See application file for complete search history.

(56) References Cited

U.S. PATENT DOCUMENTS

| | | | | |
|---|---|---|---|---|
| 7,237,309 | B2 * | 7/2007 | Nicaise | ................ B23C 3/002 |
| | | | | 29/27 C |
| 7,448,120 | B2 * | 11/2008 | Ohmori | ................ B23C 3/002 |
| | | | | 269/258 |
| 8,404,997 | B2 * | 3/2013 | Dilger | ................ B23B 13/02 |
| | | | | 219/121.67 |
| 2007/0199187 | A1 | 8/2007 | Ohmori et al. | |
| 2009/0116915 | A1 * | 5/2009 | Kawasumi | ............. B23B 3/065 |
| | | | | 483/14 |
| 2010/0288089 | A1 * | 11/2010 | Miyamoto | ................ B23B 5/08 |
| | | | | 82/118 |
| 2013/0160514 | A1 * | 6/2013 | Mitze | ................ B21D 3/10 |
| | | | | 72/224 |

FOREIGN PATENT DOCUMENTS

| | | | | |
|---|---|---|---|---|
| FR | 2792864 | | 11/2000 | |
| FR | 2833196 | | 6/2003 | |
| GB | 2271945 | A * | 5/1994 | ............. B23Q 1/48 |

* cited by examiner

METHOD AND MACHINE FOR MACHINING PARTS IN BAR FORM WITH AUTOMATIC PART REVERSING AND RECALIBRATION SYSTEM

PRIORITY

Priority is claimed, under 35 U.S.C. § 119, to French application No. FR 1354126, filed May 6, 2013, the disclosure of which is incorporated herein by reference in its entirety.

FIELD OF THE INVENTION

The invention applies to machines for machining parts in bar form, such as extruded, molded and similar profile sections, and in particular to asymmetrical parts, equipped with at least 2 stocks or equivalent system allowing the rotation of the part about its long axis and its longitudinal displacement.

The invention can be applied notably to the machines described by FR2833196, but also to the machines that use a comparable working principle (parts machine in the air between stocks or equivalent system).

BACKGROUND

The machines used for these works have a particular morphology. They are generally equipped with stocks or a torsion bar system making it possible to position the profile section to be machined under a broaching tool and to drive it with the movements necessary to the milling operations that make it possible to produce the part.

These movements are combinations of longitudinal displacements and rotations about the long axis of the part.

To machine all the faces of a profile section in order to obtain a finished part, it is necessary to work in at least 2 phases having different lays. The first phase is for machining a part of the surfaces by taking reference on two rough faces. The second is for machining the remaining rough faces, after reversing the part and calibrating on the previously machined faces.

This part reversal and recalibration operation is performed manually by the operator of the machine. The invention makes it possible to perform this operation automatically. It thus eliminates the fatigue associated with this operation for the operator and the risk of poor positioning of the part after reversal. It thus allows for a significant productivity gain.

SUMMARY OF THE INVENTION

The invention consists of an automatic method for changing the machining reference frame, referred to in the profession as "auto-reverse", on a machine for machining parts from bars, notably extruded or molded profile sections, the part to be machined being held during its machining by at least two distinct and independent clamping means each having a longitudinal movement and a rotation on an axis parallel to the long axis of the part to be machined allowing for a relative angular and longitudinal displacement of one relative to the other, wherein, in order to proceed with a change of reference frame, one of the clamping means releases the part to be machined and disengages therefrom on the long axis of the part to turn freely about this axis independently of the other clamping means, then aligns itself angularly on new clamping references of the part before retaking the latter by engaging on the same long axis of the part and allowing for a change of grip by the other clamping means.

To simplify the description of the invention, the term "stock" will be used hereinbelow to designate the part gripping devices, bearing in mind that it applies also to all the gripping devices making it possible to machine parts in air between at least two gripping points. Similarly, "rotation of a stock" will be the term used to describe the rotation of the jaws thereof.

The machines for machining parts in bar form comprise 2, 3 or 4 stocks divided up into 2 groups. The part to be machined is then held on one of its ends by a first group of stocks consisting of one or two stocks while the other group also consisting of one or two stocks ensures the holding of the other end.

It is assumed here that the machine comprises only 2 stocks (the detailed description of the invention deals with an exemplary machine with 4 stocks).

The angular and linear independence of the stocks makes it possible to hold the part to be machined on one side only of the machine, for example by the stock 1, and to release the stock 2 situated on the side opposite the holding of the part. The released stock 2 is then desynchronized relative to the stock 1, and pivots relative to the latter by a programmed angle, for example by 180°. The part is then retaken by the stock 2 and released by the stock 1. The part is thus reversed automatically on its new reference in the stock 2. The released stock 1 can then pivot to be angularly realigned, then is resynchronized in rotation on the stock 2. The bar is then retaken by the stock 1 and positioned to continue the machining operations. Thus, the bar has been turned over on its reference without the intervention of an operator.

As has just been seen, according to the invention, the part to be machined is retaken successively with different clamping reference frames in order to machine all the surfaces which have to be machined.

The invention also consists of a machine for machining parts from bars, notably extruded or molded profile sections, the part to be machined being held during its machining by at least two distinct clamping, means each having a longitudinal movement and a rotation on an axis parallel to the long axis of the part to be machined, wherein the clamping means have an angular independence allowing a relative rotation of one relative to the other.

The machine according to the invention has a parameterizable numerical control and command system for automating all of the programming, origin vector pivoting, offsetting and machine routine functions.

DETAILED DESCRIPTION OF THE INVENTION

The invention consists, apart from the provisions explained above, of a certain number of other provisions that will be more explicitly examined hereinbelow with regard to exemplary embodiments described with reference to the attached drawings, but which are in no way limiting, in these drawings:

FIGS. 1 to 7 show a schematic representation of the successive steps of operation of the automatic system for reversing and recalibrating a part to be machined, a profile section element, according to the invention.

In these very schematic figures, only the stocks 1, 2, 5, 6, the part to be machined 3 and a machining tool 4 are represented, because they suffice for an understanding of the invention.

The stocks 1 and 2 make it possible to hold the part to be machined in the vicinity of the cutting tool so as to limit the bow of the part between its bearing points and improve the machining quality. They have means for rotation about the long axis of the part 3 but not necessarily means for longitudinal displacements along this long axis. It is assumed here that these stocks 1 and 2 have longitudinal displacement means. The stocks 5 and 6 have means for rotation about the long axis of the part 3 and means for longitudinal displacements along this long axis. They ensure the displacement of the part 3 under the tool 4.

For a detailed description of the mode of operation of the machine, reference can be made to the patent FR2833196 of the applicant.

Figure 1:
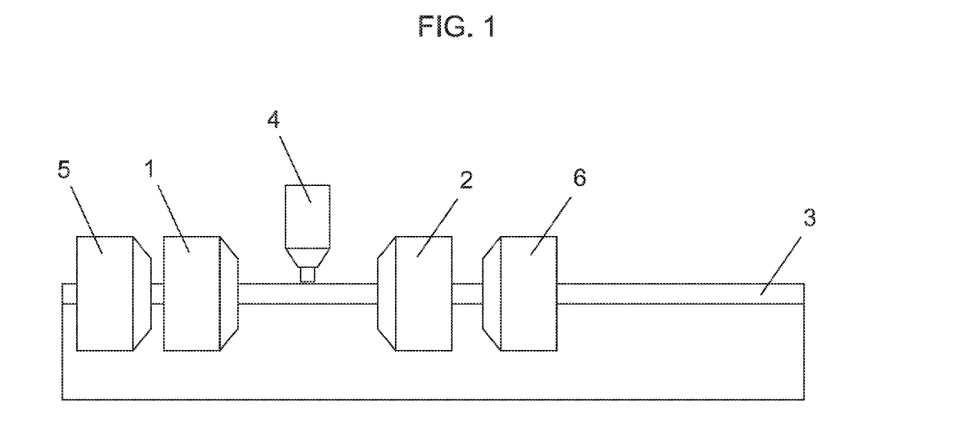
FIG. 1 is a longitudinal schematic representation of a machine according to the invention in a first state corresponding to the machining of a part placed on a first reference frame.

In FIG. 1, the part 3 is represented in a first machining phase. It is held on a first reference frame by the 4 stocks, with, for example, a secure fixing provided, by the stock 6 and a sliding fixing provided by the other stocks 1, 2 and 5.

Figure 2:
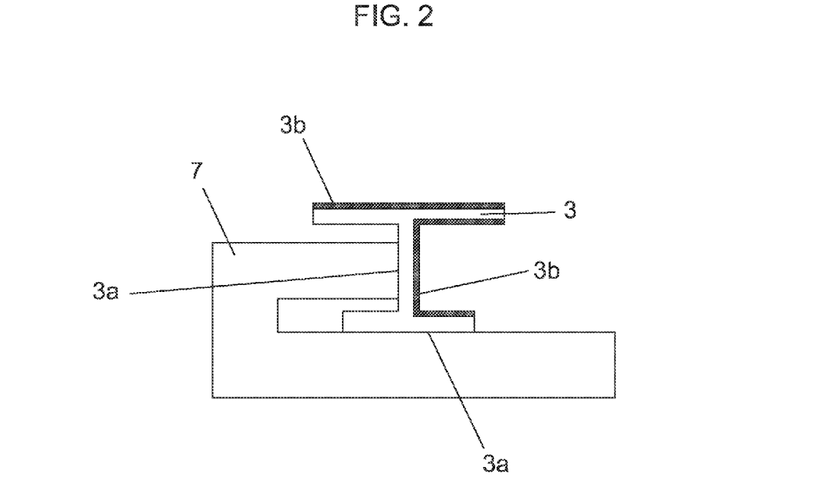
FIG. 2 is a transversal schematic representation showing a cross section of the part bearing on the first reference frame of FIG. 1.

FIG. 2 shows, in more detail, the part 3 with its surfaces 3a used as first reference frame bearing on the fixed jaws 7 of the stock 2 for the machining of the surfaces 3b.

Figure 3:
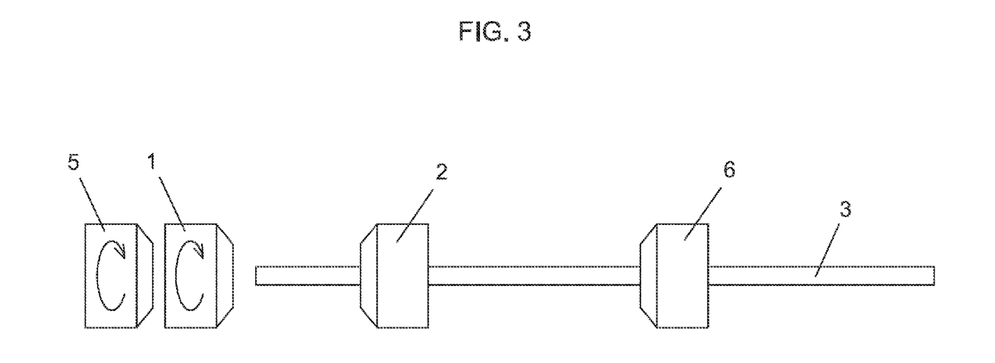
FIG. 3 is a longitudinal schematic representation similar to FIG. 1, in which a change of reference frame is in progress, the part to be machined being then held by the stocks 2 and 6.
Figure 4:
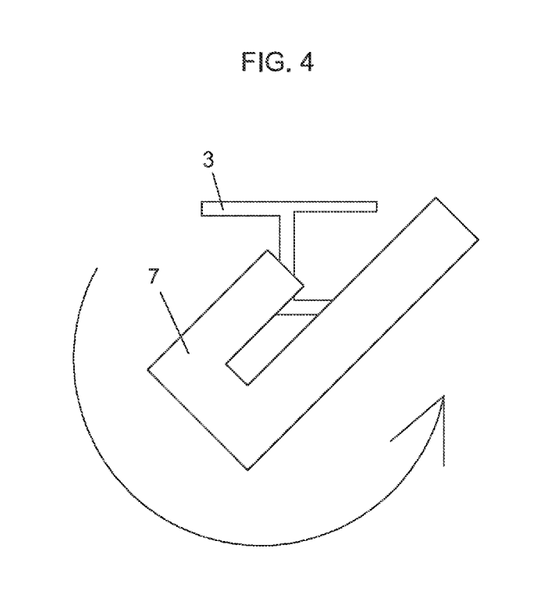
FIG. 4 is a transversal schematic representation similar to FIG. 2, in which a change of reference frame is in progress, the part to be machined being then held by the stocks 2 and 6.

As represented in FIG. 3, with the machining of this first phase finished, the part 3 is released from the stocks 1 and 5 so as to allow the rotation thereof. It then remains held on the first reference frame by means of the stocks 2 and 6. FIG. 4 illustrates the rotation of the stocks 1 and 5 relative to the part 3.

Figure 5:
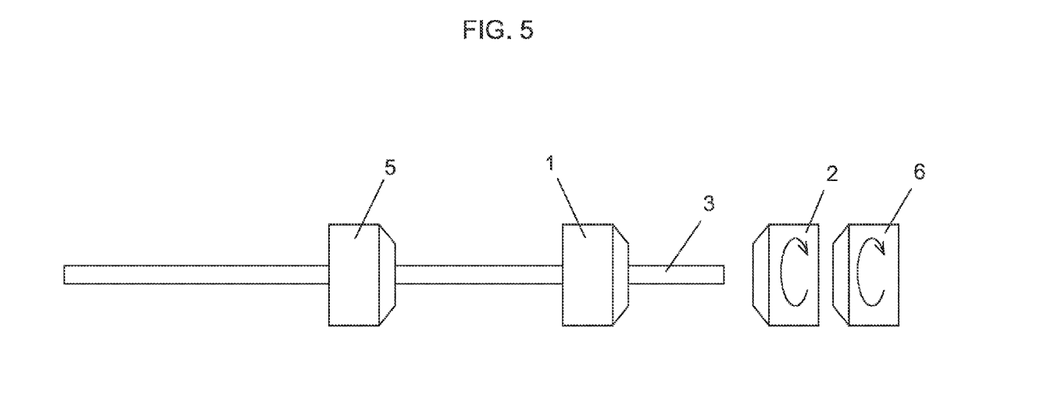
FIG. 5 is a longitudinal schematic representation similar to FIG. 3, in another phase of the change of reference frame in progress, the part to be machined being then held by the stocks 1 and 5.
Figure 6:
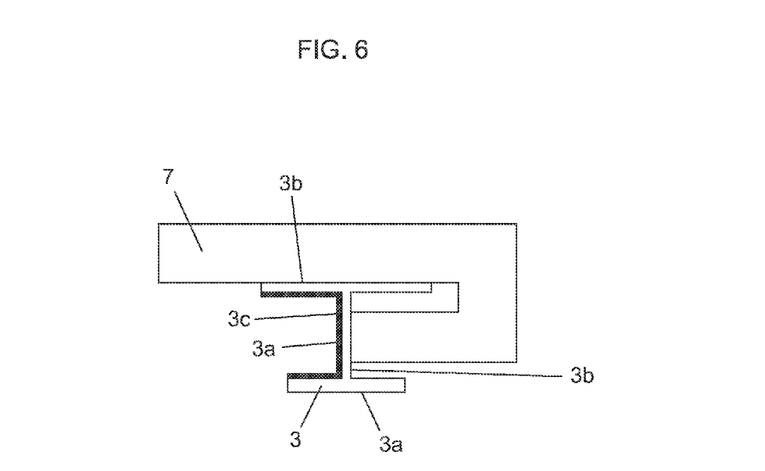
FIG. 6 is a transversal schematic representation similar to FIG. 4, in another phase of the change of reference frame in progress, the part to be machined being then held by the stocks 1 and 5.

Once the rotation of the stocks 1 and 5 is finished, the part 3 is transferred from the stocks 2 and 6 to the stocks 1 and 5. FIGS. 5 and 6 illustrate the position of the part 3 at the end of this transfer. The stocks 2 and 6 can then in turn be driven by a rotational movement to be positioned angularly like the stocks 1 and 5.

Figure 7:
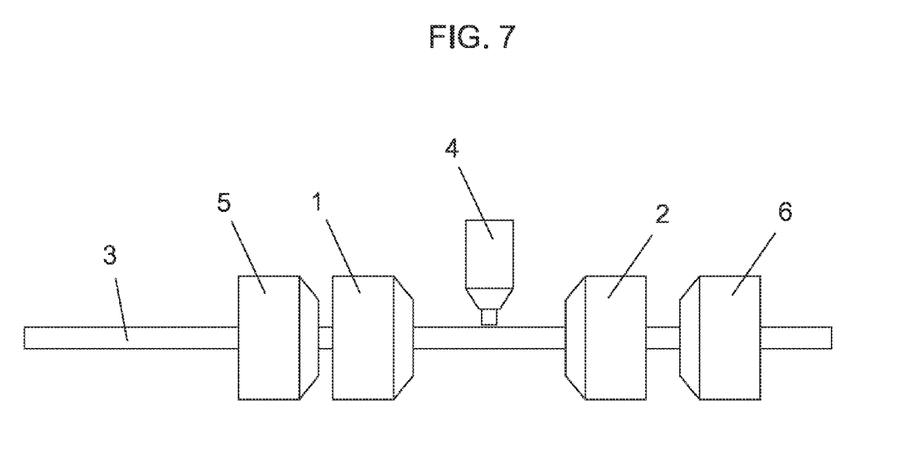
FIG. 7 is a longitudinal schematic representation similar to FIG. 1, in a second state corresponding to the machining of the other surfaces of the part placed on a second reference frame, the latter being then again held by the four stocks.

Then, as represented in FIG. 7, the part 3 is slid towards the stocks 2 and 6 to its start-of-machining position.

This first example represents the typical case of machining of a symmetrical profile section in "auto-reverse" mode. This principle can be extended to "asymmetrical" or "exotic" profile sections that do not allow a pivoting about the centre of symmetry of the part to be machined.

Figure 8:
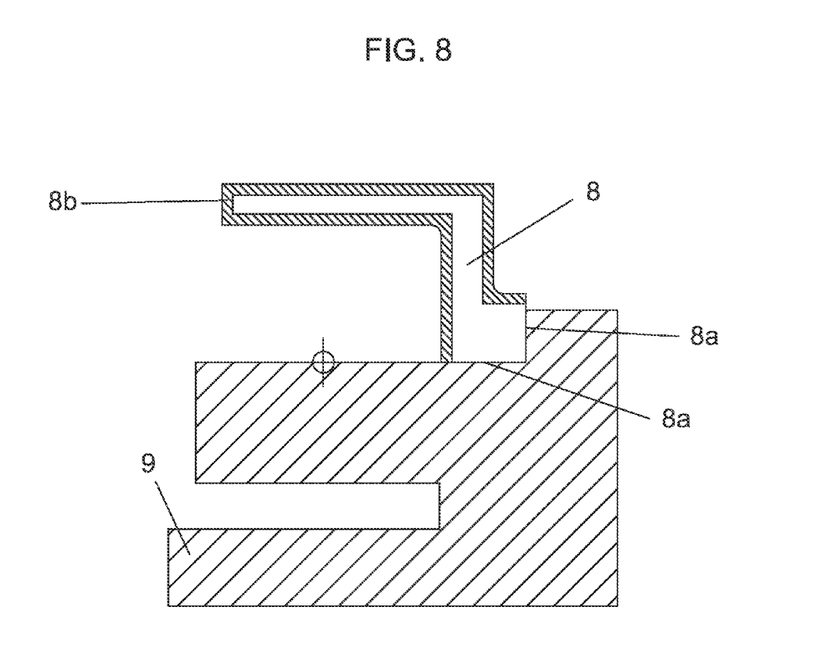
FIG. 8 is a transversal schematic representation showing a cross section of an asymmetrical part bearing on a first reference frame.
Figure 9:
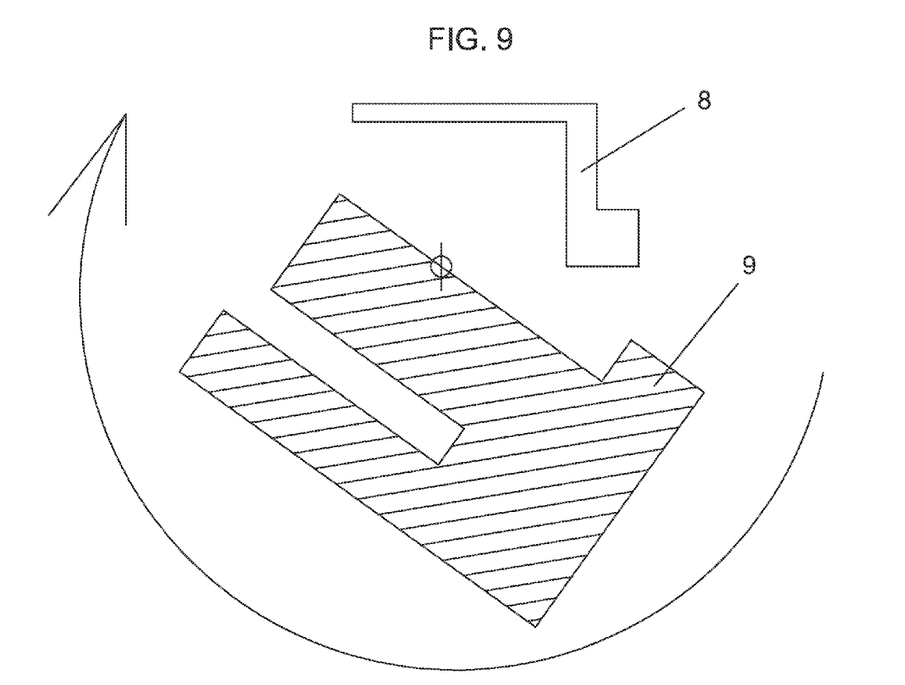
FIG. 9 is a transversal schematic representation similar to FIG. 8, in which a change of reference frame is in progress.
Figure 10:
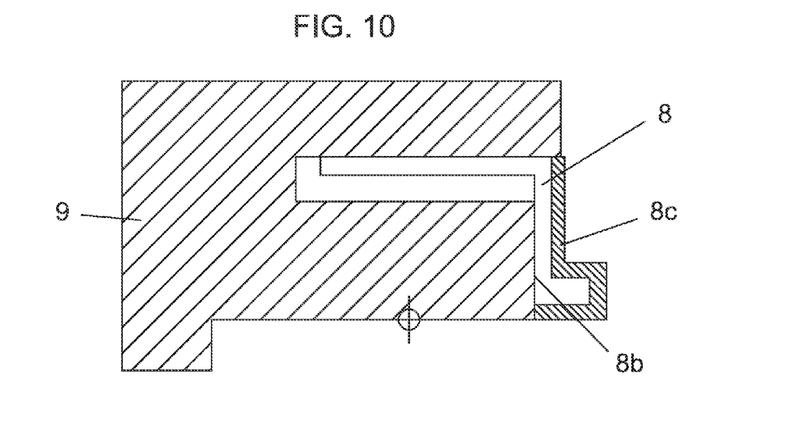
FIG. 10 is a transversal schematic representation similar to FIG. 8, after the change of reference frame.

The following example, represented in FIGS. 8 to 10, relates to an asymmetrical part 8.

In FIG. 8, the part 8 is represented in a first machining phase. It is held on a first reference frame consisting of its surfaces 8a by the 4 stocks, with, for example, a secure fixing provided by the stock 6 and a sliding fixing provided by the other stocks 1, 2 and 5. This phase allows for the machining of all the surfaces 8b. At the end of this machining sequence, the part remains held on the stock 6 while the stocks 1, 2 and 5 are released so as to allow the rotation of their jaws about the part.

FIG. 9 thus illustrates the rotation of the stocks 1, 2 and 5 after the machining of the surfaces 8b so as to change reference frame.

As represented in FIG. 10, at the end of the rotation of the stocks 1, 2 and 5, the part 8 is retaken on these stocks with a new reference frame allowing the machining of the surfaces 8c. The stock 6 then releases the part 8 and is positioned on the same reference frame as the stocks 1, 2 and 5, and the machining can continue.

As has just been seen, according to the invention, a number of referencing areas can be defined on one and the same fixed support, arranged around the center of rotation of the stocks. It is possible:

to machine a complex part by redefining, for each operation, the most suitable reference frame, to machine thicknesses greater than the maximum travel of the clamping jaws (on each lay, the total travel of the jaws is arranged on the new reference frame), an operation that is not possible in the conventional "auto-reverse" function.

The invention also makes it possible to carryout, in a single operation, the so-called "staple" machining of complex parts, by defining a first lay on which the part is roughly cut, and by machining "guiding rails" directly on the rough or semi-finished profile section.

Figure 11:
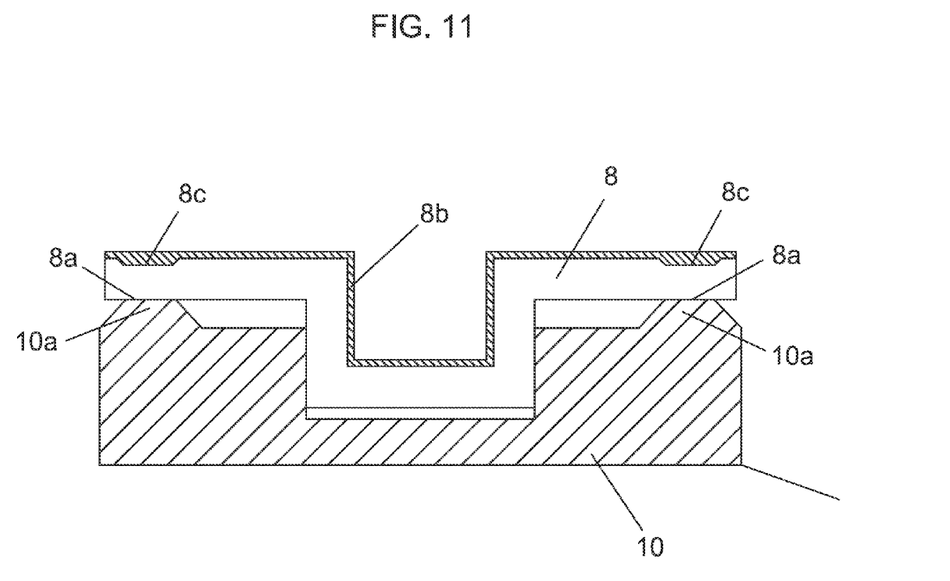
FIG. 11 is a transversal schematic representation showing a cross section of an asymmetrical part bearing on a first reference frame for a so-called "staple" machining.
Figure 12:
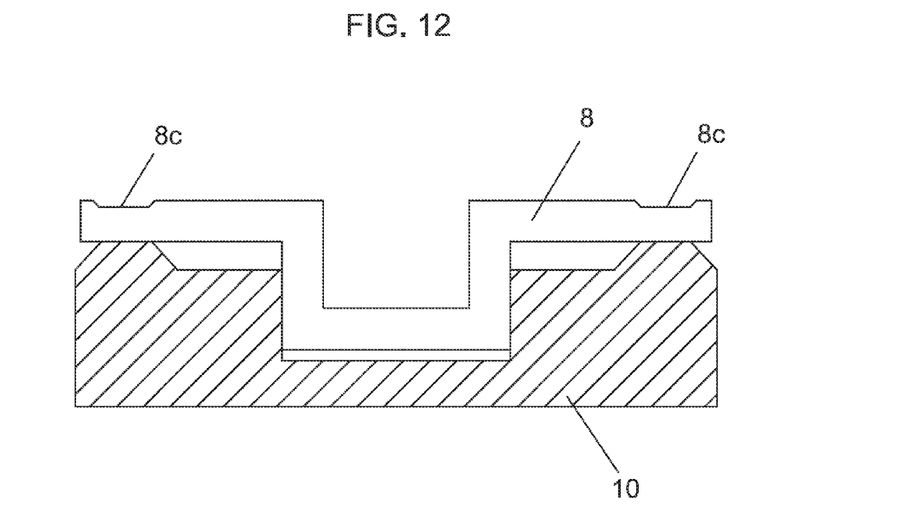
FIG. 12 is a transversal schematic representation similar to FIG. 11, after the end of a first machining operation.

FIGS. 11 to 15 illustrate an example of staple machining according to the invention. As represented in FIG. 11, the part to be machined 8 is initially held on a first reference frame 8a so as to allow the machining of the surfaces 8b and notably of two "rails" 8c intended to subsequently be placed in the lays 10a of the support 10. After the machining of this first phase, the part 8 represented in FIG. 12 is obtained.

Figure 13:
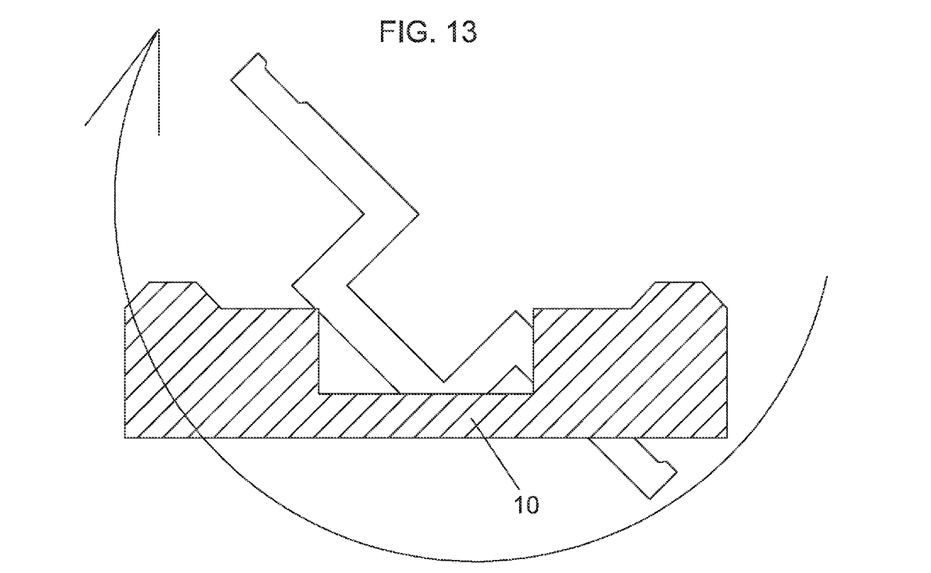
FIG. 13 is a transversal schematic representation similar to FIG. 12, in which a change of reference frame is in progress.

As represented in FIG. 13, the part 8 is then turned over so as to place it automatically on a second reference frame according to the "auto-reverse" method of the invention.

Figure 14:
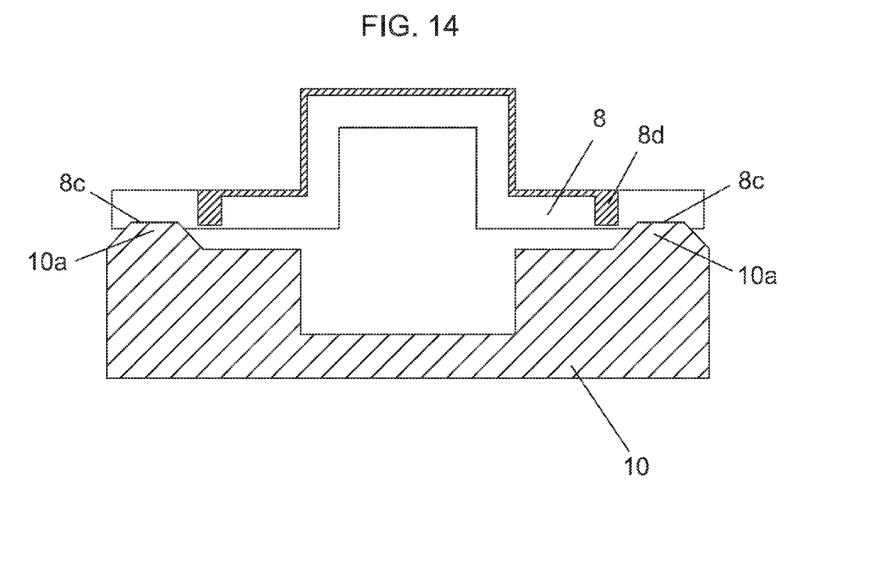
FIG. 14 is a transversal schematic representation similar to FIG. 12, after the change of reference frame.

The second lay consists in guiding and/or clamping the "rails" 8c previously machined automatically in the lays 10a designed for this purpose, acting as accurate reference for the finishing of the part. It is then possible to machine the surfaces 8d.

Figure 15:
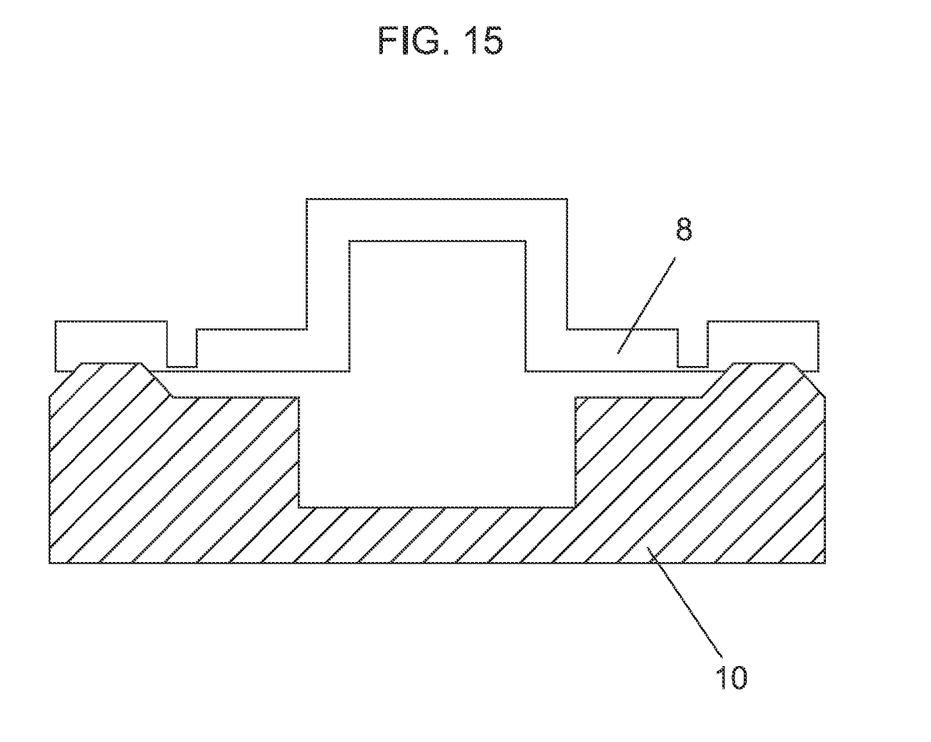
FIG. 15 is a transversal schematic representation similar to FIG. 12, after the end of the second machining operation.

FIG. 15 represents the part after the final operation of precutting of the part from its ends acting as reference surfaces. The operator or an automated system then only has to detach the references front the part to obtain a finished part.

What is claimed is:

1. An automatic method for changing a machining reference frame on a machine for machining a part from a bar, the bar being held during machining by at least two distinct and independent clamping devices, each having a longitudinal movement along, and a rotation about, an axis parallel to a long axis of the bar, allowing for a relative angular and longitudinal displacement of one of said at least two clamping devices relative to an other of said at least two clamping devices, wherein, in order to proceed with a change of reference frame,
the one of said at least two clamping devices releases the bar and disengages therefrom to turn freely about the long axis of the bar independently of the other of said at least two clamping devices, then aligns angularly into a different clamping reference frame of the bar before retaking the bar, and
the other of said at least two clamping devices, after the one of said at least two clamping devices retakes the bar, releases the bar and disengages therefrom to turn freely about the long axis of the bar independently of the one of said at least two clamping devices, then aligns angularly into the different clamping reference frame of the bar before retaking the bar.

2. The method as claimed in claim 1, wherein the bar is retaken successively with varying clamping reference frames in order to machine a plurality of surfaces of the part.

3. The method as claimed in claim 1, wherein the bar comprises an extruded or molded profile section.

4. An automated method for machining a part from a bar, the process comprising:
holding the bar during machining with a first gripping device and a second gripping device in accordance with a first rotational reference frame, each gripping device being movable longitudinally along and rotationally about an axis parallel to a longitudinal axis of the bar, such that each gripping device is angularly and longitudinally displaceable relative to the other gripping device; and
changing a frame of reference during machining by:
disengaging the first gripping device from the bar;
rotating the first gripping device about the axis relative to the bar;
reengaging the first gripping device with the bar so that the first gripping device holds the bar in accordance with a second rotational reference frame, the second rotational reference frame being different from the first rotational reference frame;
disengaging the second gripping device from the bar;
rotating the second gripping device about the axis relative to the bar; and
reengaging the second gripping device with the bar so that the second gripping device holds the bar in accordance with the second rotational reference frame.

5. The method as claimed in claim 4, wherein the bar comprises an extruded or molded profile section.

6. The method as claimed in claim 4, wherein a first surface of the part is machined when the bar is held in accordance with the first reference frame, and wherein a second surface of the part is machined when the bar is held in accordance with the second reference frame, the second surface being different from the first surface.

7. The method as claimed in claim 4, wherein:
holding the bar during machining further comprises holding the bar with a third gripping device and a fourth gripping device; and
changing the frame of reference during machining further comprises engaging and disengaging the third and fourth gripping devices from the bar synchronously with the engaging and disengaging of the bar by the first gripping device.

8. The method as claimed in claim 4, wherein:
holding the bar during machining further comprises holding the bar with a third gripping device and a fourth gripping device; and
changing the frame of reference during machining further comprises:
engaging and disengaging the third gripping device from the bar synchronously with the engaging and disengaging of the bar by the first gripping device; and
engaging and disengaging the fourth gripping device from the bar synchronously with the engaging and disengaging of the bar by the second gripping device.

* * * * *